(12) United States Patent
Berkhahn et al.

(10) Patent No.: US 9,154,325 B2
(45) Date of Patent: Oct. 6, 2015

(54) APPARATUS AND METHOD FOR TRANSFERRING DATA AND ENERGY VIA DEVICES OF A NETWORK

(75) Inventors: Sven-Olaf Berkhahn, Ohlendorf (DE); Christian Riedel, Bliedersdorf (DE)

(73) Assignee: Airbus Operations GmbH, Hamburg (DE)

( * ) Notice: Subject to any disclaimer, the term of this patent is extended or adjusted under 35 U.S.C. 154(b) by 985 days.

(21) Appl. No.: 13/214,838

(22) Filed: Aug. 22, 2011

(65) Prior Publication Data
US 2012/0043808 A1 Feb. 23, 2012

Related U.S. Application Data

(63) Continuation of application No. PCT/EP2010/051914, filed on Feb. 16, 2010.

(60) Provisional application No. 61/154,475, filed on Feb. 23, 2009.

(30) Foreign Application Priority Data

Feb. 23, 2009 (DE) .......................... 10 2009 001 081

(51) Int. Cl.
*B60L 1/00* (2006.01)
*B60L 3/00* (2006.01)
(Continued)

(52) U.S. Cl.
CPC ................ *H04L 12/403* (2013.01); *B60L 1/00* (2013.01); *H04B 3/44* (2013.01); *H04L 12/10* (2013.01);
(Continued)

(58) Field of Classification Search
CPC . Y02T 10/7005; Y02T 10/7077; B60R 16/03; B60R 16/0315; B60L 11/14; B60L 1/10
USPC ................ 307/9.1–10.6, 64, 66, 126; 320/103
See application file for complete search history.

(56) References Cited

U.S. PATENT DOCUMENTS

| | | | |
|---|---|---|---|
| 5,539,388 A | 7/1996 | Modgil |
| 5,903,607 A | 5/1999 | Tailliet |

(Continued)

FOREIGN PATENT DOCUMENTS

| | | |
|---|---|---|
| CN | 1204879 | 1/1999 |
| CN | 101027870 | 8/2007 |

(Continued)

OTHER PUBLICATIONS

German Office Action for DE 10 2009 001 081.5 dated Aug. 13, 2009.
(Continued)

*Primary Examiner* — Rexford Barnie
*Assistant Examiner* — Jagdeep Dhillon
(74) *Attorney, Agent, or Firm* — Jenkins, Wilson, Taylor & Hunt, P.A.

(57) ABSTRACT

An apparatus and a method for transferring data and energy over network units of a defined network. The apparatus has at least two units, a bus coupling the units with a receive line and a transmit line and a bus control device coupled with the bus, the bus control device having first means for controlling the transfer of data defined by the defined network as data voltage signals over the transmit line and over the receive line, second means for charging the data voltage signals on the transmit line with first supply voltage signals adapted for voltage supply of units of a first plane system, and third means for charging the data voltage signals on the receive line with second supply voltage signals adapted for voltage supply of units of a second plane system.

14 Claims, 7 Drawing Sheets

(51) Int. Cl.
*H02G 3/00* (2006.01)
*H04L 12/403* (2006.01)
*H04B 3/44* (2006.01)
*H04L 12/10* (2006.01)
*H04L 12/40* (2006.01)
*B60R 16/03* (2006.01)
*B60L 11/14* (2006.01)

(52) U.S. Cl.
CPC .......... *H04L 12/40045* (2013.01); *B60L 11/14* (2013.01); *B60R 16/03* (2013.01); *B60R 16/0315* (2013.01); *H04L 2012/4028* (2013.01); *Y02T 10/7005* (2013.01); *Y02T 10/7077* (2013.01)

(56) References Cited

U.S. PATENT DOCUMENTS

| | | | |
|---|---|---|---|
| 5,949,327 | A | 9/1999 | Brown |
| 7,009,996 | B1 | 3/2006 | Eddy et al. |
| 7,190,267 | B2 * | 3/2007 | Vaserfirer .................. 340/540 |
| 7,598,625 | B2 * | 10/2009 | Yu et al. ...................... 307/9.1 |
| 2003/0174726 | A1 | 9/2003 | Dove |
| 2005/0116701 | A1 * | 6/2005 | Hechtfischer et al. ......... 324/95 |
| 2006/0187021 | A1 * | 8/2006 | Stevenson ............... 340/538.11 |
| 2006/0274746 | A1 * | 12/2006 | Kuschke et al. ............. 370/389 |
| 2007/0230501 | A1 | 10/2007 | Bibby et al. |

FOREIGN PATENT DOCUMENTS

| | | |
|---|---|---|
| DE | 19705643 A1 | 8/1998 |
| DE | 19716011 | 10/1998 |
| DE | 102006004191 A1 | 8/2007 |
| EP | 1684187 A1 | 7/2006 |
| EP | 2009526 A2 | 12/2008 |
| JP | 50-67513 | 6/1975 |
| JP | 02-026836 | 1/1990 |
| JP | 04-211526 | 8/1992 |
| JP | 11-308257 | 11/1999 |
| JP | 2006-521031 | 9/2006 |
| JP | 2007-318305 | 12/2007 |
| JP | 2008-219480 | 9/2008 |
| RU | 2230187 | 6/2004 |
| RU | 2254681 | 6/2005 |
| RU | 2285336 | 10/2006 |
| RU | 2325032 | 5/2008 |
| WO | WO 2010/052333 A1 | 5/2010 |

OTHER PUBLICATIONS

International Search Report for PCT/EP2010/051914 dated Jul. 5, 2010.
Chinese Office Action for Application No. 201080009010.1 dated Jun. 20, 2013.
Notice of Allowance for Application No. JP 2011-550544 dated Feb. 8, 2013.
Russian Decision to Grant for Application No. 2011134726/07 dated Feb. 12, 2013.

* cited by examiner

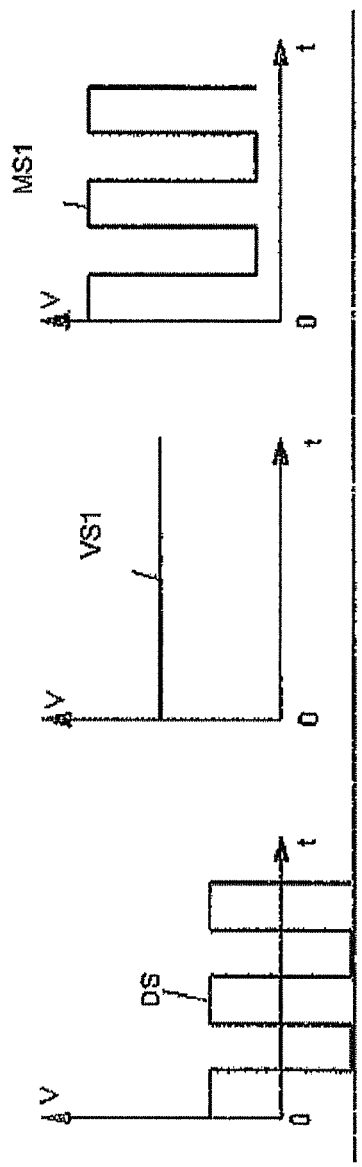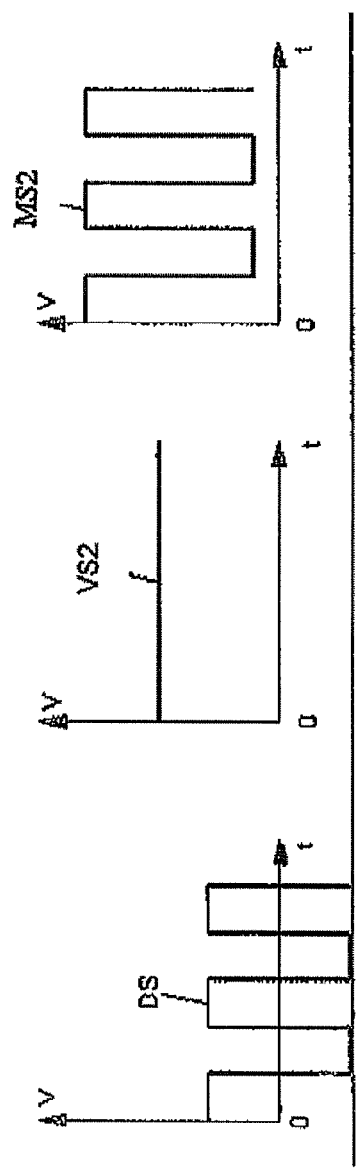

APPARATUS AND METHOD FOR TRANSFERRING DATA AND ENERGY VIA DEVICES OF A NETWORK

CROSS-REFERENCE TO RELATED APPLICATIONS

This application is a continuation of and claims priority to PCT/EP2010/051914 filed Feb. 16, 2010 which claims the benefit of and priority to U.S. Provisional Application No. 61/154,475, filed Feb. 23, 2009 and German Patent Application No. 10 2009 001 081.5 filed Feb. 23, 2009, the entire disclosures of which are herein incorporated by reference.

FIELD OF THE INVENTION

The present invention relates to an apparatus and to a method for transferring data and energy via devices of a specific network.

Although having applicability in many areas, the present invention is described in greater detail with reference to an aircraft or to a passenger aircraft.

The technical field of the invention relates, in particular, to the transmission of data via devices, such as network nodes, of a specific network in an aircraft, in particular in an aircraft cabin of an aircraft.

Used in the currently existing cabin management systems of the applicant, the so-called Cabin Intercommunication Data System (CIDS), for the transmission of data, in particular of safety-relevant data, such as the safety-relevant control and audio data, between a central control apparatus and a plurality of terminals installed in the aircraft cabin, is a special data bus, known as the CIDS data bus.

The current CIDS data bus is based on the transmission of ethernet frames, and is equipped with a master or bus control device, which is disposed in the central control apparatus of the aircraft, and with a plurality of network nodes, known as Decoder-Encoder Units (DEUs), which can operate as a client.

To this end, FIG. 1 shows a schematic block diagram of an embodiment of a conventional network 1 for the transmission of data via network nodes 2-4. The network nodes 2-4 are coupled via a bus 11 to a bus control device 14. The bus 11 comprises a transmission line 12 and a receiving line 13. The transmission line 12 and the receiving line 13 are looped through the network nodes 2-4. Coupled to each of the network nodes 2-4 are one or more terminals 5-10. In the embodiment shown in FIG. 1, the non-safety-relevant terminals 5, 6 are coupled to the network node 2. The bus 11 or data bus is here based on the physical 10 Mbit/s ethernet layer. The channel access to the transmission line 12 and the receiving line 13 takes place via a statically a-priori defined and deterministic time-slot procedure, which is controlled by the bus control device 14. In the time slots defined by the time-slot procedure, the data for the terminals 5-10 coupled to the network nodes 2-4 are transmitted by frames or data frames.

In addition to the safety-relevant data, such as safety-relevant control data, a respective frame may also comprise non-safety-relevant audio data, which are transmitted as a broadcast to all network nodes 2-4 that are coupled to the bus 11. The time interval between two time slots is here defined such that it corresponds precisely to a reciprocal of the sampling rate of the audio data. Owing to the design of the CIDS data bus and the statically a-priori defined and deterministic time-slot procedure used, the safety-relevant data are transmitted to all the coupled terminals 5-10 with a high degree of synchronicity and temporally deterministically with a minimum latency period. This is necessary to prevent Hall effects and echo effects in the reproduction of the audio data via the numerous loudspeakers in the aircraft cabin. The data bus or bus 11 is further highly reliable, since the failure of individual network nodes 2-4 has no effect on the data transmission to the remaining network nodes, as the data lines, the transmission line 12 and the receiving line 13, are looped through the network nodes 2-4 and are not passed through active driver modules. However, it is a disadvantage of the current data bus that it is not possible also to transmit IP data packets via this CIDS data bus.

Further, the AFDX (Avionics Full Duplex) switched ethernet data bus is increasingly being used in the aircraft cabin for the transmission of safety-relevant data. This data bus is specified in ARINC Standard 665, and uses the IP protocol for data transmission.

The AFDX network topology consists of one or more switches, to which the terminals are connected. Data transmission between two terminals always takes place via at least one of these AFDX switches.

Owing to this specific network topology, based on the AFDX switches, different latency times and jitter effects disadvantageously occur during an end-to-end transmission between two terminals, since the data have to be buffered in each switch at least briefly. The duration of the buffering in the respective network nodes depends definitively on the workload of the network, and is therefore a-priori unknown. The duration of the buffering is restricted by a static, a-priori defined configuration of the data streams, so that no data are rejected, and a quasi-determinism is ensured.

As already stated above, the current CIDS data bus disadvantageously does not allow any transmission of IP data packets. Furthermore, owing to the differing latency times and the jitter effects, the AFDX data bus is unsuitable for a synchronous transmission of the audio data to all loudspeakers in the cabin during data transmission to the terminals.

The use of an ethernet data bus with a higher data-transmission rate, for example 100 Mbit/s, is furthermore desirable, in particular so that new or supplementary functions can be integrated. One example of such an ethernet data bus with a higher data-transmission rate is the 100BaseT ethernet data bus. With the 100BaseT ethernet data bus, it is, however, necessary to amplify or regenerate the data signal in every network node. This is necessary because, with the 100BaseT ethernet data bus, the physical signal characteristic of the data signals would be severely distorted without amplification by looping through the network nodes. This signal distortion would aggregate with every looping through a network node, meaning that the reliable reception of the data signals in the final or downstream network node of the data bus would no longer be ensured.

Because safety-relevant data or data signals are also transmitted via the network nodes, the network nodes are safety-critical aircraft apparatus and therefore have to be equipped with a redundant power supply in addition to the conventional, simple coupling to the on-board power supply by cable and plug.

In addition to the arrangement of the network nodes as a safety-critical system, there exist in the aircraft further safety-critical systems or aircraft systems that exhibit a higher safety rating as compared with other aircraft systems.

By virtue of aeronautical safety engineering requirements, the different systems, in particular those with different safety ratings, must be activated with different redundant power-supply devices.

Thus, a fault in the redundant power supply of a system of a low safety rating can, by virtue of the physical separation from the redundant power-supply device of a system of a higher safety rating, have no negative effect on the redundant power supply of the system with a higher safety rating.

The redundant power supplies conventionally take the form of cables and plugs, which are coupled to the on-board power supply.

However, these redundant power supplies require the above-mentioned additional wiring, resulting in additional costs for materials, installation and the necessary servicing.

SUMMARY OF THE INVENTION

Accordingly, it is an object of the present invention to provide a cost-effective solution for separate, redundant power supplies for devices of different aircraft systems, which devices are coupled via a bus.

This object is achieved according to the invention by an apparatus for transferring data and energy via devices of a specific network with the features of claim 1, and by a method for transferring data and energy via devices of a specific network with the features of claim 14.

Accordingly, an apparatus for transferring data and energy via devices of a specific network of an aircraft is proposed, comprising:
at least two devices;
a bus, with a transmission line and a receiving line, that couples the devices;
a bus control device coupled to the bus and comprising:
a first means that is set up to control a transmission of data defined according to the specific network as data-voltage signals via the transmission line and via the receiving line,
a second means that is set up to load the data-voltage signals on the transmission line with suitable first supply-voltage signals for supplying voltage to the devices of a first aircraft system,
a third means that is set up to load the data-voltage signals on the receiving line with second voltage signals suitable for supplying voltage to the devices of a second aircraft system.

The respective means, the first, second and third means and the means referred to hereinafter as the decoupling means or coupling means, may be implemented either via hardware or via hardware and software. In the case of implementation by hardware, the respective means may take the form of an apparatus such as a computer or microprocessor, a device or a part of a system such as a computer system. In the case of implementation by hardware and software, the respective means may take the form of a computer program product, a function, a routine, a part of a program code or an executable object.

In addition, an aircraft with an apparatus as described above for transferring data and energy via network nodes of a specific network is proposed.

Furthermore, a method for transferring data and energy via devices of a specific network of an aircraft is proposed, which method comprises the following steps:
a) Coupling of at least two devices via a bus with a transmission line and a receiving line;
b) Control of a transmission of data, defined according to the specific network, as data-voltage signals via the transmission line and via the receiving line,
c) Loading of the data-voltage signals on the transmission line with first supply-voltage signals suitable for supplying power to the devices of a first aircraft system; and
d) Loading of the data-voltage signals on the receiving line with second voltage signals suitable for supplying power to the devices of a second aircraft system.

The network preferably takes the form of an ethernet network, in particular a 100 Mbit/s ethernet network. The network nodes and terminals are respectively coupled to the conventional on-board power supply of the aircraft via plugs and cables.

One advantage of the present invention lies in the fact that data (as data-voltage signals) and separate, redundant power supplies for different aircraft systems of the aircraft can be transmitted via a single bus with a transmission line and a receiving line.

Owing to the transmission of the first supply-voltage signals for the first aircraft system via the transmission line, and the transmission of the second supply-voltage signals for the second aircraft system via the receiving line, the redundant power supplies for the first aircraft system and the second aircraft system are physically separated from one another. The two supply voltages transmitted via the transmission line and the receiving line are redundant in relation to the conventional power supply by means of plugs and cables coupled to the on-board network.

Owing to the use of the bus or data bus inherently provided for the transmission of data in order to provide the redundant power supplies for the different aircraft systems, the proposed solution is cost-effective by virtue of the additional wiring that is no longer required.

Furthermore, the second means and the third means of the bus control device are supplied, in particular, from the emergency power supply for the aircraft, so that even in the event of failure of the normal power supply or the on-board power supply in the aircraft, the emergency voltage of the emergency power supply is available to the second means and the third means, and thereby the supply-voltage signals can even be provided in the event of failure of the on-board power supply. All safety-relevant systems and apparatus in the aircraft are supplied via the emergency power supply. The supply-voltage signals are loaded onto the data-voltage signals and transmitted via the bus.

In the respective device, for example in the respective network node, the supply-voltage signals and the data-voltage signals can be separated by means of suitable devices or decoupling devices. The respective first or second supply-voltage signal provided via the bus can then be routed to the significant components in the network node, for example of an amplifier device or of a selection of coupled terminals, which are, in particular, safety-critical devices. Accordingly, if the normal aircraft power network or the on-board network fails, or if the respective power pack of the network node malfunctions, the significant components of the network node will continue to be supplied via the redundant power supply of the respective supply-voltage signals, and can thus continue to transmit data, in particular safety-critical data.

Advantageous embodiments and improvements of the invention are contained in the sub-claims.

According to one preferred development, the at least two devices take the form of at least two network nodes or at least one network node and at least one coupled terminal.

According to a further preferred development, the at least two devices comprise a plurality of network nodes with a respective number of coupled terminals.

According to a further preferred development, the first aircraft system exhibits a higher safety rating and the second aircraft system exhibits a lower safety rating.

According to a further preferred development, the first aircraft system takes the form of a cabin management system of the aircraft, and the second aircraft system takes the form of a reading lamp system with reading lamps in the cabin of the aircraft.

According to a further preferred development, the first means is set up to control the transmission via the bus, in a predetermined sequence, of first frames with safety-relevant data and second frames with non-safety-relevant data, defined according to the specific network, as the data-voltage signals, to set a respective time interval between two respective first frames transmitted via the transmission line and between two respective first frames transmitted via the receiving line as a function of a specific sampling rate of the bus through the coupled terminals, and to control a transmission of at least one respective second frame via the transmission line and via the receiving line within the respective time interval.

One advantage of this preferred development lies in the fact that a common transmission of safety-relevant data with a firmly defined time interval with minimal latency and with minimal jitter, and of non-safety-relevant data, such as IP data packets, and simultaneously redundant power supplies for devices of different aircraft systems can be provided.

According to a further preferred development, the network nodes are equipped with respective amplification devices for amplification of the signals on the transmission line and the receiving line, wherein the second means configures the first supply-voltage signals in a manner such that they are suitable for supplying power to the amplification devices of the network nodes.

According to a further preferred development, the second means provides the first supply-voltage signals in a manner such that they are suitable for supplying power to the amplification devices of the network nodes and to a specific selection of coupled terminals associated with the first aircraft system.

According to a further preferred development, the second means superposes the data-voltage signals provided by the first means on the first supply-voltage signals to create first modulated voltage signals, and couples the first modulated voltage signals into the transmission line.

According to a further preferred development, the third means superposes the data-voltage signals provided by the first means on the second supply-voltage signals to create second modulated voltage signals, and couples the second modulated voltage signals into the receiving line.

According to a further preferred development, the respective device, in particular the respective network node, comprises a decoupling device equipped with a first decoupling means and a second decoupling means. The first decoupling means is set up to decouple the first supply-voltage signals from the first modulated voltage signals transmitted via the transmission line. The second decoupling means is further set up to decouple the second supply-voltage signals from the second modulated voltage signals transmitted via the receiving line.

According to a further preferred development, the respective network node comprises a coupling device equipped with a first coupling means and a second coupling means. The first coupling means is set up to couple into the transmission line the first supply-voltage signals decoupled by the first decoupling means for transmission to the respective downstream network node. The second coupling means is further set up to couple into the receiving line the second supply-voltage signals decoupled by the second decoupling means for transmission to the respective downstream network node.

According to a further preferred development, the second means and the third means of the bus control device are coupled to an emergency power-supply device of the aircraft for power supply purposes.

Furthermore, the second frames with the non-safety-relevant IP data packets are transmitted, in particular, in a best-effort procedure or mode. Owing to the use of the best-effort procedure for transmission of the second frame, the overall data-transmission rate of the bus is advantageously maximised. Furthermore, the realtime capability of the transmission of the first frames with the safety-relevant data is ensured through the use of a time-slot procedure.

Owing to the transmission of the first frames with the safety-relevant data and the second frames with the non-safety-relevant data via a common, hybrid data bus, the requirement to implement a data bus parallel to the conventional CIDS data bus for transmission of the IP packets is dispensed with. As a result, weight, costs and the overall outlay for the network of the aircraft can be reduced. Furthermore, the costs of customer-specific adaptations can be reduced, since just one single network, not the two networks hitherto, need be configured.

According to a further preferred development, the respective time interval takes the form of a time slot, which corresponds to a reciprocal of the sampling rate of the audio data through the coupled terminals.

In addition to the safety-relevant data, the first frame may also contain audio data, which are transmitted as a broadcast to all network nodes. In a case of this kind, the respective time slot of the time-slot procedure may be set in a manner such that it corresponds to a reciprocal of the sampling rate of the audio data through the terminals.

According to a further preferred development, the respective time slot contains a first partial time slot for the transmission of precisely one first frame, and a second partial time slot for the transmission of at least one second frame.

The sum of the first partial time slot and the second partial time slot is smaller than the time slot and thereby smaller than the time interval between two respective first frames transmitted via the transmission line and between two respective first frames transmitted via the receiving line.

According to a further preferred development, the respective first frames are transmitted via the transmission line and the receiving line of the bus in the respective first partial time slot by means of a static, deterministic time-slot procedure.

According to a further preferred development, the terminals coupled by means of the network nodes are controlled by means of the static, deterministic time-slot procedure in a manner such that, within the respective predetermined time slot of a cycle with a specific number of time slots, precisely one specific terminal can receive one first frame via the transmission line and can transmit precisely one first frame via the receiving line.

The number of time slots in a cycle preferably corresponds to the number of terminals coupled to the bus so that, in every cycle, precisely one first frame can be transmitted to each terminal via the transmission line, and furthermore the respective terminal can transmit precisely one first frame via the receiving line.

According to a further preferred development, the bus control device controls the network nodes coupled by the bus by means of the time slot procedure in a manner such that, within a respective predetermined time slot, precisely one specific network node can receive, via the transmission line, precisely one first frame for a coupled terminal and at least one second frame, and can transmit, via the receiving line, precisely one first frame of a coupled terminal and at least one second frame.

According to a further preferred development, the bus control device and the network nodes are coupled by the bus in a daisy-chain arrangement, wherein the network nodes are coupled to the bus control device by the transmission line of the bus and by the receiving line of the bus, wherein the transmission line and the receiving line are looped through the respective network nodes.

According to a further preferred development, the first frames and the second frames take the form of ethernet frames, wherein the specific network preferably takes the form of an ethernet network, particularly preferably a 100BaseT ethernet network.

According to a further preferred development, a respective first frame is composed of:
- a first field with an ethernet preamble;
- a second field with audio data, in particular audio broadcast data;
- a third field with an address indicating at least the respective terminal of the respective network node;
- a fourth field with the safety-relevant data; and
- a fifth field with an ethernet checksum.

According to a further preferred development, the address of the third field of the first frame takes the form of an address tuple, wherein a first element of the address tuple addresses the respective network node, and a second element of the address tuple addresses the respective terminal of the respective network node.

According to a further preferred development, a respective second frame is composed of:
- a first field with an ethernet preamble;
- a second field with an address indicating at least a respective network node;
- a third field with an IP data packet; and
- a fourth field with an ethernet checksum.

According to a further preferred development, within one cycle with a number N2 of time slots, the bus control device transmits, via the transmission line, respectively at least a first frame to the respective terminal addressed by the second element of the address tuple of the fourth field of the first frame, in a respective time slot of the cycle.

According to a further preferred development, the respective network node is equipped with a switch device disposed between the decoupling device and the coupling device, wherein the switch device passes a respective first frame to the relevant addressed terminal as a function of the second element of the address tuple.

According to a further preferred development, the network nodes coupled by the bus are controlled by the bus control device using the time-slot procedure in a manner such that, within a respective predetermined time slot, precisely one specific network node can receive, via the transmission line, precisely one first frame for a coupled terminal and at least one second frame, and can transmit, via the receiving line, precisely one first frame of a coupled terminal and at least one second frame.

According to a further preferred development, the particular network node in the respective time slot of the cycle is authorised, following transmission of the respective first frame of the terminal addressed by the second element of the address tuple of the first frame received in the respective time slot, to transmit, via the receiving line, using the best-effort procedure, one or more second frames.

According to a further preferred development, the bus control device transmits the respective second frame in a broadcast mode via the bus, wherein the coupled network nodes each receive the second frames, extract the IP packet of the second frame and pass the IP packet to the respective terminal addressed by the IP address of the IP packet if the addressed terminal is coupled to the respective network node.

According to a further preferred development, the authorisation of the respective network node to transmit the second frames via the receiving line within the respective cycle is regulated by setting a number of first frames to be transmitted to these respective network nodes.

The invention is further described below by way of embodiments, reference being made to the accompanying figures of the drawings.

BRIEF DESCRIPTION OF THE DRAWINGS

In the figures:

FIG. 3a is a schematic graph for production of the first modulated voltage signals from the data-voltage signals and the first supply-voltage signals according to the invention;

FIG. 3b is a schematic graph for production of the second modulated voltage signals from the data-voltage signals and the second supply-voltage signals according to the invention;

DESCRIPTION OF EXEMPLARY EMBODIMENTS

Figure 1:
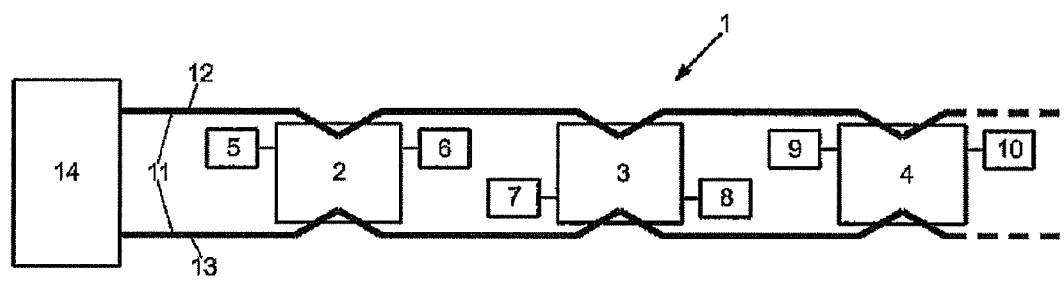
FIG. 1 is a schematic block diagram of an embodiment of a conventional apparatus for the transmission of data via network nodes of a specific network.

In the figures, identical reference numerals relate to identical or functionally equivalent components unless otherwise indicated.

Figure 2:
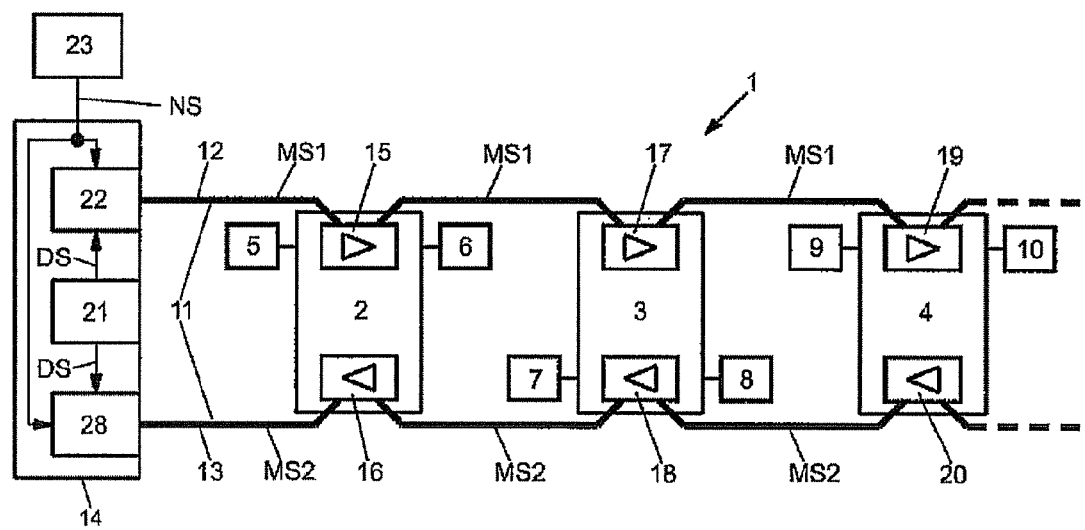
FIG. 2 is a schematic block diagram of a first embodiment of an apparatus for the transmission of data and energy via devices of a specific network according to the invention.

FIG. 2 shows a schematic block diagram of an embodiment of an apparatus according to the invention for the transmission of data DS, R1, R2 and energy VS1, VS2 via network nodes 2-4 of a specific network 1.

The network nodes 2-4 are coupled to a respective number of terminals 5-10. Without loss of generality, the respective network nodes 2-4 are in each case coupled to two terminals 5-10 in the embodiment in FIG. 2. For example, network node 2 is coupled to terminals 5 and 6. The bus 11 for coupling of network nodes 2-4 is equipped with a transmission line 12 and a receiving line 13. The transmission line 12 and the receiving line 13 preferably each take the form of a twin-core cable. The bus 11 couples the network nodes 2-4 in a daisy-chain arrangement. The transmission line 12 and the receiving line 13 are preferably looped through the network nodes 2-4. To amplify the signals on the transmission line 12 and the receiving line 13, the respective network node 2-4 is preferably equipped with an amplification device 15-20. Further, a bus control device 14 is provided to control the bus 11.

The bus control device 14 is integrated, in particular, in the central control device of the aircraft. The bus control device 14 is further equipped with a first means 21 set up to transmit data R1, R2 defined according to the specific network 1 as data-voltage signals DS via the transmission line 12 and the receiving line 13. The first means 21 is here set up, in particular, to transmit, via the bus 11, first frames R1, for example CIDS frames, with safety-relevant data D1, and second frames R2 with non-safety-relevant data D2, for example IP data packets or TCP/IP data packets, defined according to the specific network 1, for example the ethernet network, as data-voltage signals DS in a predetermined sequence. The predetermined sequence of the first frames R1 and the second frames R2 may be, for example, an alternating sequence.

The respective time interval ZS1-ZS2 between two respective first frames R1 transmitted via the transmission line 12 and between two respective first frames R1 transmitted via the receiving line 13 is set as a function of a specific sampling rate of the bus 11 through the coupled terminals 5-10. Within the respective time interval ZS1-ZS2, at least one respective second frame R2 is transmitted via the transmission line 12 and via the receiving line 13 in addition to a respective first frame R1.

The network nodes 2-4 are preferably also set up for a transmission of this kind.

The bus control device 14 further comprises a second means 22. The second means 22 is set up to load the data-voltage signals DS on the transmission line 12 with first supply-voltage signals VS1 suitable for supplying voltage to the devices of a first aircraft system.

The bus control device 14 further comprises a third means 28. The third means 28 is set up to load the data-voltage signals DS on the receiving line 13 with second supply-voltage signals VS2 suitable for supplying voltage to the devices of a second aircraft system.

The first aircraft system here exhibits, in particular, a higher safety rating than the second aircraft system. For example, the first aircraft system takes the form of a cabin management system (CIDS system) of the aircraft, and the second aircraft system takes the form of a reading lamp system with reading lamps in the cabin of the aircraft.

At least the second means 22 and the third means 28, and preferably the first means, the second means and the third means 21, 22, 28, are supplied by an emergency voltage NS from an emergency power-supply device 23 of the aircraft.

In particular, the second means 22 provides the first supply-voltage signals VS1 in a manner such that they are suitable for supplying voltage to the amplification devices 15-20 of the network nodes 2-4 and to a specific selection of coupled terminals 5-10 associated with the first aircraft system.

Here, the second means 22 superposes preferably the data-voltage signals DS supplied by the first means 21 on the first voltage-supply signals VS1 to create first modulated voltage signals MS1, and couples these first modulated voltage signals MS1 into the transmission line 12.

In analogous fashion, the third means 28 superposes the data-voltage signals DS provided by the first means 21 on the second supply-voltage signals VS2 to create second modulated voltage signals MS2, and couples these second modulated voltage signals MS2 into the receiving line 13. To this end, FIG. 3a shows a schematic graph for creation of the first modulated voltage signals MS1 from the data-voltage signals DS and the first supply-voltage signals VS1. Analogously, FIG. 3b shows the creation of the second modulated voltage signals MS2 from the data-voltage signals DS and the second supply-voltage signals VS2.

Figure 4:
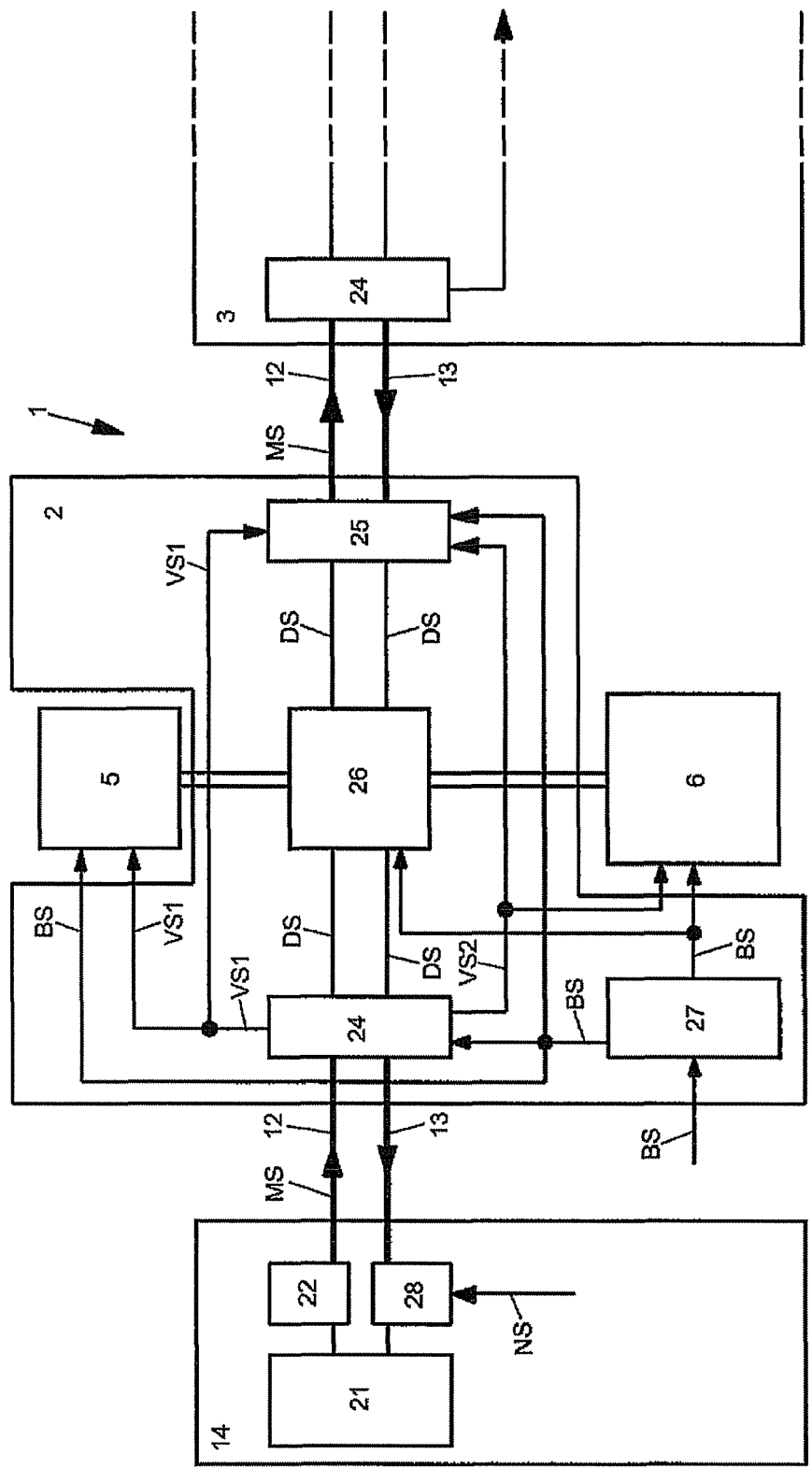
FIG. 4 is a schematic block diagram of an embodiment of a network node of the apparatus shown in FIG. 2.

Furthermore, FIG. 4 shows a schematic block diagram of an embodiment of a network node 2 according to FIG. 2.

The network node 2 shown by way of example in FIG. 4 is equipped with a decoupling device 24 and a coupling device 25.

Figure 5:
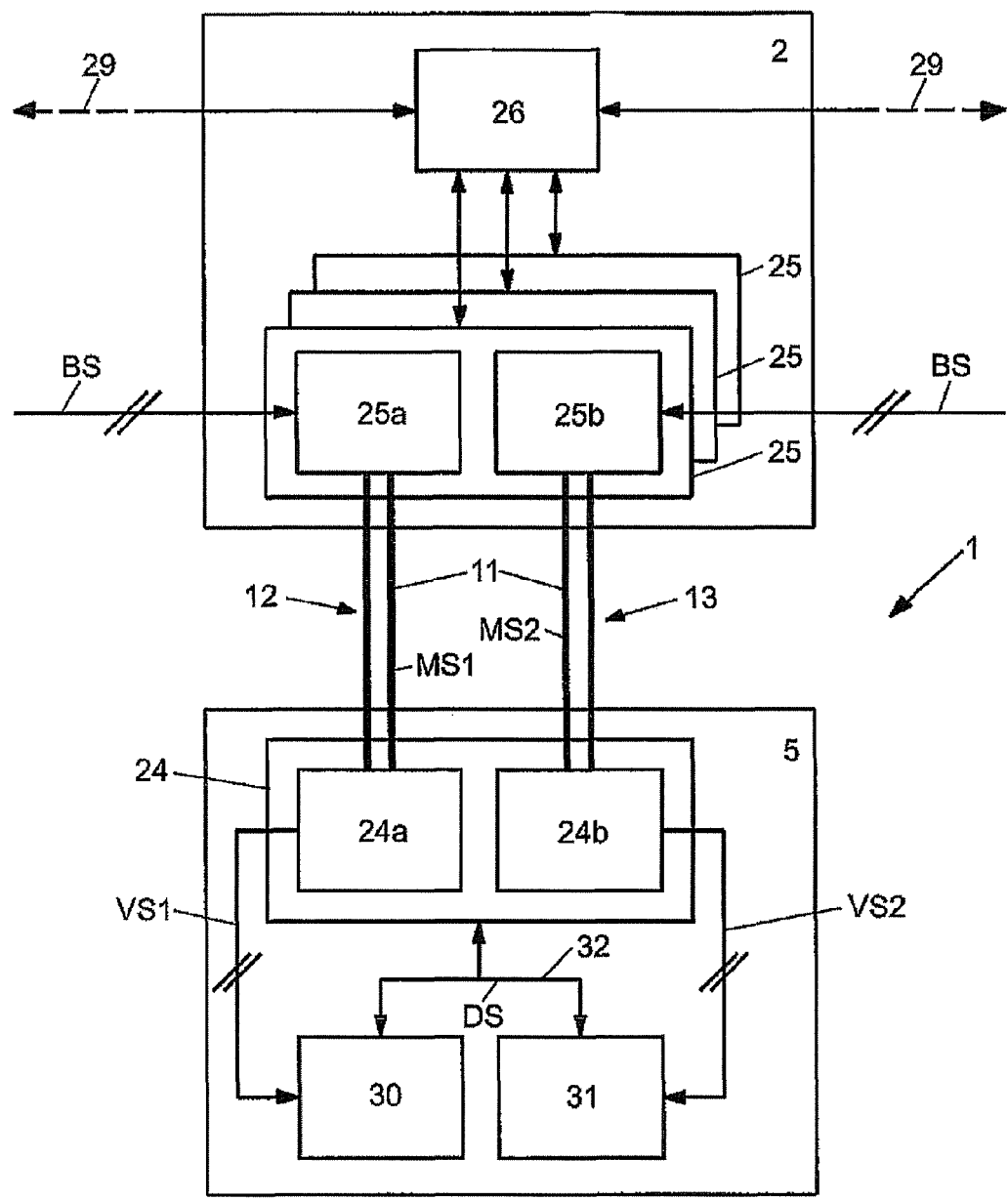
FIG. 5 is a schematic block diagram of a second embodiment of an apparatus for transmission of data and energy via devices of a specific network according to the invention.

The decoupling device 24 is equipped with a first decoupling means 24a and a second decoupling means 24b (see in this connection FIG. 5). The first decoupling means 24a is set up to decouple the first supply-voltage signals VS1 from the first modulated voltage signals MS1 transmitted via the transmission line 12. The second decoupling means 24b is further set up to decouple the second supply-voltage signals VS2 from the second modulated voltage signals MS2 transmitted via the receiving line 13.

The respective network node 2-4 is further equipped with a coupling device 25 comprising a first coupling means 25a and a second coupling means 25b.

The first coupling means 25a is preferably set up to couple the first supply-voltage signals VS1 decoupled by the first decoupling means 24a into the transmission line 12 for transmission to the respective downstream network nodes 3, 4.

The second coupling means 25b is further set up to couple the second supply-voltage signals VS2 decoupled by the second decoupling means 24b into the receiving line 13 for transmission to the respective downstream network nodes 3, 4.

In addition, FIG. 4 shows that the network node 2 is equipped with a power-supply device 27 via which the network node 2 is supplied with the on-board voltage BS.

Here, the decoupling device 24, the coupling device 25, the switch device 26, a terminal 5 of the first aircraft system and a terminal 6 of the second aircraft system are supplied with the on-board voltage BS by the power-supply device 27 via a respective power-supply line. The power supply for the decoupling device 24 and the coupling device 25 thus takes a redundant form, namely via the first supply-voltage signal VS1 and the on-board voltage BS.

The network node 2 is further equipped with a switch device 26 or a switch. The switch device 26 is disposed between the decoupling device 24 and the coupling device 25. The switch device 26 here passes a respective first frame R1 to the relevant addressed terminal 5 as a function of the second element G2 of the address tuple AT.

FIG. 5 shows a schematic block diagram of a second embodiment of an apparatus for transmission of data and energy via devices of a specific network 1 according to the invention.

According to the embodiment shown in FIG. 5, the devices 2, 5 coupled via the bus 11 take the form of a network node 2 and a terminal 5. In order to couple the modulated voltage signals MS1, MS2 into the transmission line 12 and into the receiving line 13 respectively, the network node 2 is equipped with the coupling device 25. Without loss of generality, the network node 2 may, for the purpose of coupling a plurality of terminals 5, comprise a corresponding plurality of coupling devices 25.

Correspondingly, the respective terminal 5 is equipped with a decoupling device 24 for decoupling the first supply-voltage signal VS1 (by decoupling means 24a) and the second supply-voltage signal VS2 (by decoupling means 24b) respectively.

The relevant first decoupling means 24a is further suitable for supplying the decoupled first supply-voltage signal VS1 to the components or devices 30 of the first aircraft system. Analogously, the second decoupling means 24b is set up for supplying the decoupled second supply-voltage signal VS2 to the components or devices 31 of the second aircraft system.

The devices 30, 31 of the first aircraft system and of the second aircraft system are further coupled to the decoupling device 24 by means of a data line 32 for transmission of the data signals DS.

Figure 6:
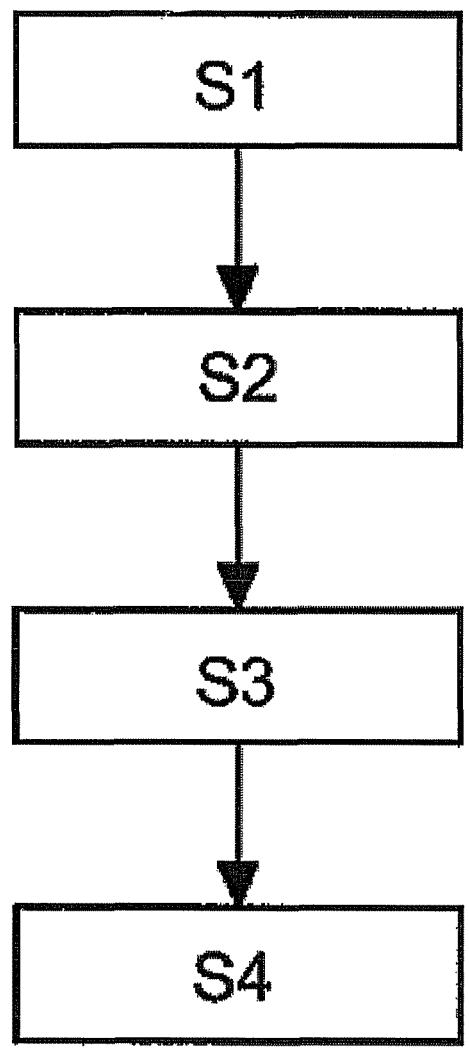
FIG. 6 is a schematic flowchart of an embodiment of a method for transmitting data and energy via network nodes of a specific network according to the invention.

FIG. 6 shows a schematic flowchart of an embodiment of a method for transmitting data DS, R1, R2 and energy VS1, VS2 via devices 2-10, for example network nodes 2-4, of a specific network 1, for example an ethernet network.

The method according to the invention is described below in relation to the block diagram shown in FIG. 6, with reference to FIGS. 2 to 4 and 7 to 10.

Figure 7:
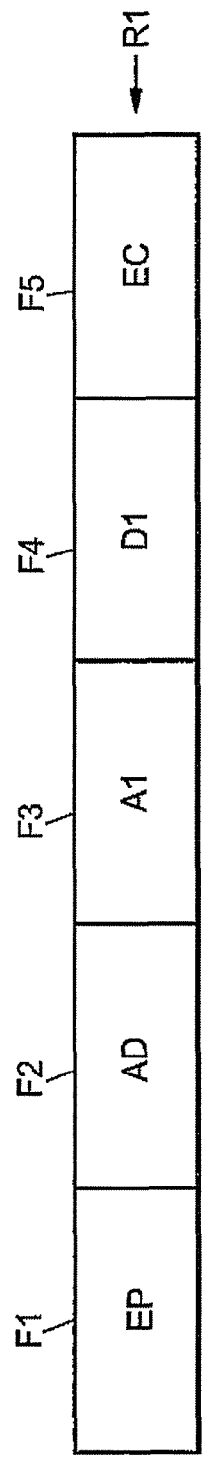
FIG. 7 is a schematic block diagram of an embodiment of a first frame according to the invention.
Figure 8:
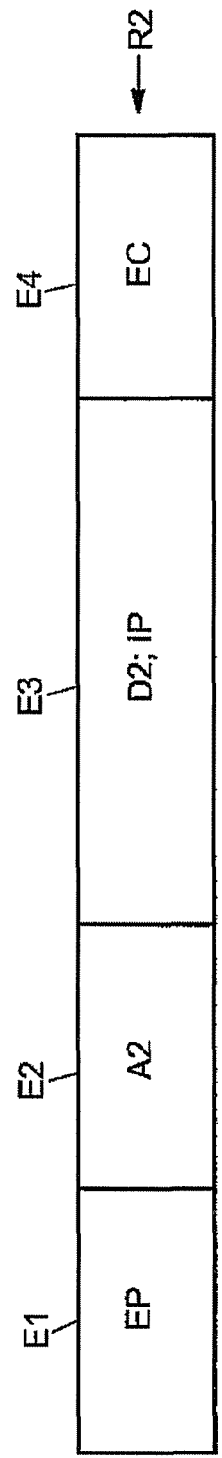
FIG. 8 is a schematic block diagram of an embodiment of a second frame according to the invention.

Here, FIGS. 7 and 8 show schematic block diagrams of embodiments of, respectively, a first frame R1 and a second frame R2 according to the invention.

Figure 9:
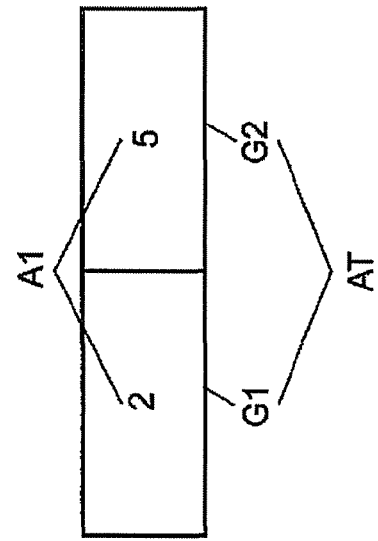
FIG. 9 is a schematic block diagram of an embodiment of an address tuple of the first frame according to FIG. 7.

Further, FIG. 9 shows a schematic block diagram of an embodiment of an address tuple AT of the first frame R1 according to FIG. 7.

Figure 10:
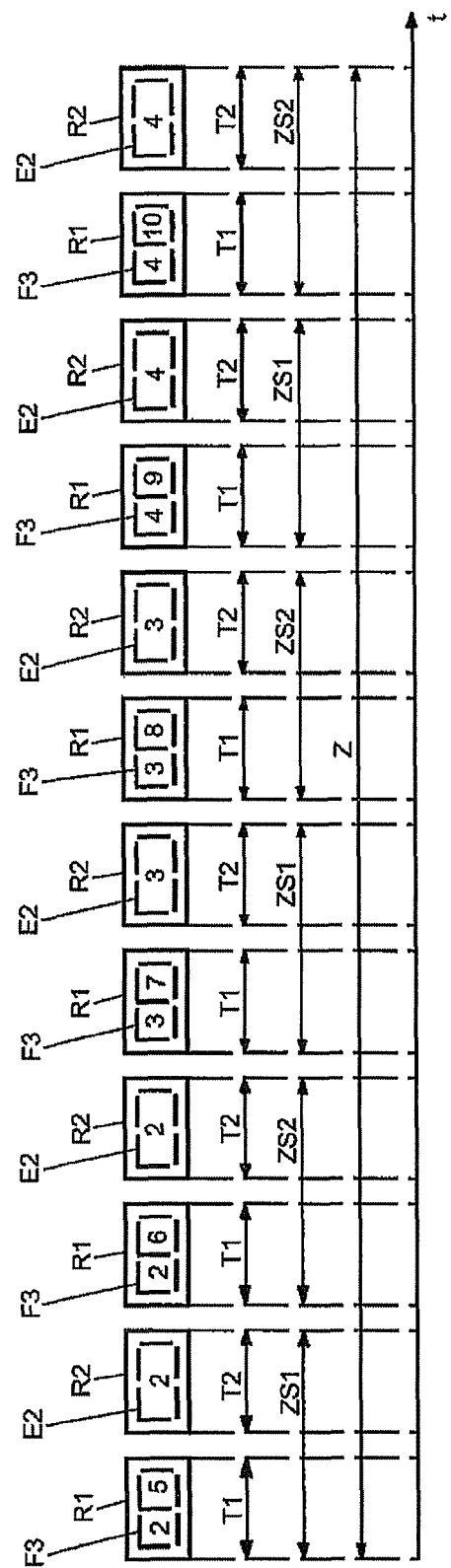
FIG. 10 is a schematic block diagram of an embodiment of a time sequence for the transmission of the first and second frames via the bus according to the invention.

In addition, FIG. 10 shows a schematic block diagram of an embodiment of a time sequence for the transmission of the first frame R1 and the second frame R2 via the bus 11 according to the invention.

The embodiment shown in FIG. 10 is here based on the embodiment shown in FIG. 2 with the three network nodes 2-4. The example addresses of the address fields F3 of the first frames R1 and of the address fields E2 of the second frames R2 are based on the reference numerals 2-4 of the individual network nodes shown in FIG. 2 and the reference numerals 5-10 of the individual, coupled terminals 5-10 shown in FIG. 2. For example, the first frame R1 of the first time slot ZS1 is intended for the terminal 5 coupled to the network node 2.

Details in this regard are described with reference to the method according to the invention as shown in FIG. 6, which comprises the following steps S1-S4:

Method Step S1:

At least two devices 2-10 are coupled by a bus 11 with a transmission line 12 and a receiving line 13. For example, referring to FIG. 2, the network nodes 2-4 are coupled to a respective number of coupled terminals 5-10 by means of the bus 11 (data bus) in a daisy-chain arrangement.

Method Step 2:

The transmission via the transmission line 12 and via the receiving line 13 of data R1, R2, defined according to the specific network 1, as data-voltage signals DS is controlled.

Here, provision is preferably made for control of the transmission via the bus 11, in a predetermined sequence, of first frames R1 with safety-relevant data D1 and second frames R2 with non-safety-relevant data D2, defined according to the specific network 1, as the data-voltage signals DS, for the setting of a respective time interval ZS1-ZS2 between two respective first frames R1 transmitted via the transmission line 12 and between two respective first frames R1 transmitted via the receiving line 13 as a function of a specific sampling rate of the bus 11 through the coupled terminals 5-10, and for control of the transmission of at least one respective second frame R2 via the transmission line 12 and via the receiving line 13 within the respective time interval ZS1-ZS2.

The first frames R1 take the form of for example CIDS frames.

With reference to FIG. 7, the respective first frame R1 may be composed of the following fields F1-F5:
  a first field F1 with an ethernet preamble EP;
  a second field F2 with audio data AD, in particular audio broadcasting data;
  a third field F3 with an address A1 indicating at least the respective terminal 5-10 of the respective network node 2-4;
  a fourth field F4 with the safety-relevant data D1; and
  a fifth field F5 with an ethernet checksum EC, such as an ethernet CRC.

With reference to FIG. 9, the address A1 of the third field F3 of the first frame R1 takes the form of an address tuple AT, wherein a first element G1 of the address tuple AT addresses the respective network node 2-4, and a second element G2 of the address tuple AT addresses the respective terminal 5-10 of the respective network node 2. This type of exemplary addressing is also used in FIG. 10—as already mentioned above—so that the field F3 of the first frame R1 in the time slot ZS1 addresses the terminal 5 that is coupled to the network node 2.

With reference to FIG. 8, the respective second frame R2 is preferably composed of the following fields E1-E4:
  a first field E1 with an ethernet preamble EP;
  a second field E2 with an address A2 indicating at least a respective network node 2-4;
  a third field E3 with an IP data packet 1P; and
  a fourth field E4 with an ethernet checksum EC, such as an ethernet CRC.

The respective time interval ZS1-ZS2 preferably takes the form of a time slot ZS1-ZS2 corresponding to a reciprocal of the sampling rate of the audio data through the coupled terminals 5-10.

The respective time slot ZS1-ZS2 further exhibits a first partial time slot T1 (see FIG. 10) for the transmission of precisely one first frame R1 and a second partial time slot T2 (see FIG. 10) for the transmission of at least one second frame R2.

The respective first frames R1 are preferably transmitted via the transmission line 12 and the receiving line 13 of the bus 11 in the respective first partial time slot T1 by means of a static, deterministic time-slot procedure. Conversely, the respective second frames R2 are preferably transmitted in the respective second partial time slot T2 by means of a best-effort procedure.

With reference to FIG. 10, within the respective predetermined time slot ZS1-ZS2 of the cycle Z with a specific number of time slots ZS1-ZS2, precisely one specific terminal 5-10 can receive one first frame R1 via the transmission line 12 and transmit precisely one first frame R1 via the receiving line 13.

Within a cycle Z with a number N2 of time slots ZS1-ZS2, the bus control device 14 preferably transmits, via the transmission line 12, respectively at least one first frame R1 to the respective terminal 5-10 addressed by the second element G2 of the address tuple AT of the fourth field F4 of the first frame R1, in a respective time slot ZS1-ZS2 of the cycle Z.

The network node 2-4, in particular in the respective time slot ZS1-ZS2 of the cycle Z, is authorised, following transmission of the respective first frame R1 of the terminal 5-10 addressed by the second element G2 of the address tuple AT of the first frame R1 received in the respective time slot ZS1-ZS2, to transmit, via the receiving line 12, using the best-effort procedure, one or more second frames R2.

Furthermore, the bus control device 14 transmits the respective second frame R2 in a broadcast mode via the bus 11, wherein the coupled network nodes 2-4 each receive the second frames R2, extract the IP packet IP of the second frame R2 and pass the IP packet IP to the respective terminal 5-10 addressed by the IP address of the IP packet IP if the addressed terminal 5-10 is coupled to the respective network node 2-4.

The authorisation of the respective network node 2-4 to transmit the second frames R2 via the receiving line 13 within the respective cycle Z is preferably regulated by setting a number of first frames R1 to be transmitted to these respective network nodes 2-4.

Method Step S3:

The data-voltage signals DS are loaded on the transmission line 12 with first supply-voltage signals VS1 suitable for supplying power to the devices of a first aircraft system.

Method Step S4:

The data-voltage signals DS are loaded on the receiving line 13 with second supply-voltage signals VS2 suitable for supplying power to the devices of a second aircraft system.

Although the present invention has been described here with reference to preferred embodiments, it is not restricted thereto, but can be modified in diverse ways.

LIST OF REFERENCE NUMERALS

1 Network
2-4 Network nodes
5-10 Terminals
11 Bus
12 Transmission line
13 Receiving line
14 Bus control device
15-20 Amplification device
21 First means
22 Second means
23 Emergency power-supply device
24 Decoupling device
24a First decoupling means
24b Second decoupling means
25 Coupling means
25a First coupling means
25b Second coupling means
26 Switch device
27 Power-supply device
28 Third means
29 Data bus
30 Devices of the first aircraft system
31 Devices of the second aircraft system
32 Data line
A1 Address
A2 Address
AD Audio Data
AT Address Tuple
BS On-board voltage
DS Data-voltage signal
D1 Safety-relevant data
D2 Non-safety-relevant data
E1 First field of the second frame
E2 Second field of the second frame
E3 Third field of the second frame
E4 Fourth field of the second frame
EP Ethernet preamble
EC Ethernet test probe
F1 First field of the first frame
F2 Second field of the first frame
F3 Third field of the first frame
F4 Fourth field of the first frame
F5 Fifth field of the first frame
G1 First element of the address tuple
G2 Second element of the address tuple
IP IP packet
MS Modified voltage signal
NS Emergency voltage
S1-S5 Method step
T1 First partial time slot
T2 Second partial time slot
VS Supply-voltage signal
Z Cycle
ZS1-ZS2 Time slot

The invention claimed is:

1. An apparatus for transferring data and energy via devices of a specific network of an aircraft, comprising:
   a) at least two devices;
   b) a bus with a transmission line and a receiving line, which bus couples the devices;
   c) a bus control device coupled to the bus, which bus control device comprises:
      a first means set up to control a transmission of data defined according to the specific network as data-voltage signals via the transmission line and via the receiving line,
      a second means set up to load the data-voltage signals on the transmission line with suitable first supply-voltage signals for supplying voltage to the devices of a first aircraft system, and
      a third means set up to load the data-voltage signals on the receiving line with second supply-voltage signals suitable for supplying voltage to the devices of a second aircraft system.

2. The apparatus according to claim 1, wherein the at least two devices take the form of at least two network nodes or at least one network node and at least one coupled terminal.

3. The apparatus according to claim 1, wherein the at least two devices comprise a plurality of network nodes with a respective number of coupled terminals.

4. The apparatus according to claim 1, wherein the first aircraft system exhibits a higher safety rating and the second aircraft system exhibits a lower safety rating.

5. The apparatus according to claim 4, wherein the first aircraft system comprises a cabin management system of the aircraft, and the second aircraft system comprises a reading lamp system with reading lamps in a cabin of the aircraft.

6. The apparatus according to claim 2, wherein the first means is set up to control the transmission via the bus, in a predetermined sequence, of first frames with safety-relevant data and second frames with non-safety-relevant data, defined according to the specific network, as the data-voltage signals, to set a respective time interval between two respective first frames transmitted via the transmission line and between two respective first frames transmitted via the receiving line as a function of a specific sampling rate of audio data through the coupled terminals, and to control the transmission of at least one respective second frame via the transmission line and via the receiving line within the respective time interval.

7. The apparatus according to claim 2, wherein the network nodes comprise respective amplification devices for amplification of the signals on the transmission line and the receiving line, wherein the second means configures the first supply-voltage signals in a manner such that they are suitable for supplying power to the amplification devices of the network nodes.

8. The apparatus according to claim 7, wherein the second means provides the first supply-voltage signals in a manner such that they are suitable for supplying power to the amplification devices of the network nodes and to a specific selection of coupled terminals associated with the first aircraft system.

9. The apparatus according to claim 2, wherein the second means superposes the data-voltage signals provided by the first means on the first supply-voltage signals to create first modulated voltage signals, and couples the first modulated voltage signals into the transmission line.

10. The apparatus according to claim 1, wherein the third means superposes the data-voltage signals provided by the first means on the second supply-voltage signals to create second modulated voltage signals, and couples the second modulated voltage signals into the receiving line.

11. The apparatus according to claim 9, wherein the respective device comprises a decoupling device equipped with a first decoupling means and a second decoupling means,
wherein the first decoupling means is set up to decouple the first supply-voltage signals from the first modulated voltage signals transmitted via the transmission line, and
wherein the second decoupling means is set up to decouple the second supply-voltage signals from the second modulated voltage signals transmitted via the receiving line.

12. The apparatus according to claim 11, wherein the respective network node comprises a coupling device equipped with a first coupling means and a second coupling means,
wherein the first coupling means is set up to couple into the transmission line the first supply-voltage signals decoupled by the first decoupling means for transmission to respective downstream network nodes, and
wherein the second coupling means is set up to couple into the receiving line the second supply-voltage signals decoupled by the second decoupling means for transmission to the respective downstream network nodes.

13. The apparatus according to claim 1, wherein the second means and the third means of the bus control device are coupled to an emergency power-supply device of the aircraft for power supply purposes.

14. A method for transferring data and energy via devices of a specific network of an aircraft, the method comprising:
a) coupling of at least two devices via a bus with a transmission line and a receiving line;
b) controlling of a transmission of data, defined according to the specific network, as data-voltage signals via the transmission line and via the receiving line;
c) loading of the data-voltage signals on the transmission line with first supply-voltage signals suitable for supplying power to the devices of a first aircraft system; and
d) loading of the data-voltage signals on the receiving line with second supply-voltage signals suitable for supplying power to the devices of a second aircraft system.

* * * * *